US 6,605,348 B1

(12) United States Patent
Ohta et al.

(10) Patent No.: US 6,605,348 B1
(45) Date of Patent: Aug. 12, 2003

(54) HIGH STRENGTH POLYETHYLENE FIBERS AND THEIR APPLICATIONS

(75) Inventors: Yasuo Ohta; Godo Sakamoto, both of Otsu; Tadayo Miyasaka, Osaka; Takayoshi Okano, Osaka; Junichi Nakahashi, Osaka; Yukihiro Nomura; Takuya Konishi, both of Otsu, all of (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/806,685

(22) PCT Filed: Mar. 23, 2000

(86) PCT No.: PCT/JP00/01774

§ 371 (c)(1),
(2), (4) Date: Apr. 4, 2001

(87) PCT Pub. No.: WO01/12885

PCT Pub. Date: Feb. 22, 2001

(30) Foreign Application Priority Data

| Aug. 11, 1999 | (JP) | 11-227662 |
| Sep. 2, 1999 | (JP) | 11-249065 |
| Sep. 8, 1999 | (JP) | 11-254581 |
| Oct. 5, 1999 | (JP) | 11-284528 |
| Oct. 5, 1999 | (JP) | 11-284529 |

(51) Int. Cl.[7] ............. D01F 6/00; D01F 6/04
(52) U.S. Cl. ................ 428/364; 428/394
(58) Field of Search ................ 428/364, 395

(56) References Cited

U.S. PATENT DOCUMENTS 5,443,904 A * 8/1995 Ohta et al. ............ 428/364

* cited by examiner

Primary Examiner—Newton Edwards
(74) Attorney, Agent, or Firm—Morrison & Foerster LLP

(57) ABSTRACT

High strength polyethylene fibers and their applications, for example, chopped fibers, ropes, nets, ballistic materials or items, protective gloves, fiber reinforced concrete products, helmets, and other products obtained therefrom, in which the fiber is characterized in that: it contains a high molecular weight polyethylene consisting essentially of a repeating unit of ethylene; it has an intrinsic viscosity number of 5 or larger and an average strength of 22 cN/dtex or higher; and the measurement of the fiber by differential scanning calorimetry (DSC) exhibits a temperature-increasing DCS curve having at least one endothermic peak over a temperature region of 140° C. to 148° C. (on the low temperature side) and at least one endothermic peak over a temperature region of 148° C. or higher (on the high temperature side) or the number of frictions until the fiber is broken in an abrasion test according to method B for measuring abrasion resistance in the Testing Methods for Spun Yarn (JIS L 1095) is 100,000 or larger.

9 Claims, 5 Drawing Sheets

HIGH STRENGTH POLYETHYLENE FIBERS AND THEIR APPLICATIONS

TECHNICAL FIELD

The present invention relates to novel high strength polyethylene fibers and their applications. More particularly, it relates to high strength polyethylene fibers which can be widely used in various fields for industry, for example, as the chopped fiber fibers or staples to produce non-woven fabrics or spun yarns; as the ropes or nets for industrial or private use; as the materials for high performance textiles such as ballistic materials or items, or protective gloves; or as the reinforcing fibers for composite materials such as fiber reinforced concrete products or helmets.

BACKGROUND ART

For high strength polyethylene fibers, there have been disclosed, for example, in JP-B 60-47922, high strength, high modulus fibers produced by the "gel spinning method" using ultrahigh molecular weight polyethylene as the base material. These high strength polyethylene fibers have already been widely used in various fields for industry, for example, as the ropes or nets for industrial or private use; as high performance textiles such as ballistic materials or items, or protective gloves; or as the geo-textiles or working nets in the filed of civil engineering and architecture.

In recent years, these high strength polyethylene fibers have been required to have further improved performance, particularly durability, for example, mechanical durability over a long period or adaptability under severe conditions in use. Even textiles such as sportswears, or fishing lines have also been required to have durability when used for a long period. In addition, reinforcing sheets or strands to provide earthquake resistance have been required to have durability, particularly flexural fatigue resistance or abrasion resistance, such that when wound around pillars or other parts they cause no occurrence of fiber breaking at the corners.

The high strength polyethylene fibers have excellent tensile strength and excellent Young's modulus indeed, but on the other hand, the structure of their highly-oriented molecular chains is responsible for the drawback that they have poor durability, particularly poor flexural fatigue resistance and poor abrasion resistance, for example, as compared with polyesters or nylons for ordinary garments. Such drawback has become some obstacle to the wide application of high strength polyethylene fibers in various fields for industry.

Further, many attempts have been made to use high strength polyethylene fibers in the chemical processes, for example, application to non-woven fabrics such as chemical filters or battery cell separators, because of their excellent resistance to chemicals, light and weather or to apply high strength polyethylene fibers to reinforcing fibers for concrete or cement, because there has been a demand for fiber reinforced concrete products having high crack resistance and high toughness, as well as excellent impact resistance and excellent long-term durability, since accidents were caused by wall materials coming off or falling from the surface of railroad tunnels or bridges.

However, when chopped fibers or staples are produced by cutting the conventional high strength polyethylene fibers, fibrillation of the fibers or their high surface hardness is responsible for the drawback that these fibers get stuck together by pressure to form a bundle of fibers, lacking in dispersibility. Further, when they are used as the reinforcing fibers for concrete or cement, their dispersibility in the cement matrix becomes deteriorated by flexure or entanglement of the fibers. For this reason, various treatments have been needed, for example, premixing with cement, hydrophilicity-providing treatment using metal oxides, or binding with resins.

DISCLOSURE OF INVENTION

To overcome such drawbacks, the orientation of the extended polyethylene molecular chains should be more relaxed, which method, however, causes a lowering of strength and Young's modulus and cannot, therefore, be employed. Further, polyethylene fibers have no strong interaction between the molecular chains and easily cause fibrillation by repeated fatigue, which makes it very difficult to improve the durability of these fibers.

Thus an objective of the present invention is to provide high strength polyethylene fibers and their applications, which fibers have about the same or higher strength and Young's modulus than those of the conventional high strength polyethylene fibers, and further have excellent flexural fatigue resistance and excellent abrasion resistance, and hardly cause fibrillation, and still further have high surface hardness.

That is, the present invention relates to high strength polyethylene fibers characterized in that: the fiber comprises a high molecular weight polyethylene consisting essentially of a repeating unit of ethylene; it has an intrinsic viscosity number of 5 or larger and an average strength of 22 cN/-dtex or higher; and the measurement of the fiber by differential scanning calorimetry (DSC) exhibits a temperature-increasing DCS curve having at least one endothermic peak over a temperature region of 140° C. to 148° C. (on the low temperature side) and at least one endothermic peak over a temperature region of 148° C. or higher (on the high temperature side).

The present invention further relates to high strength polyethylene fibers characterized in that: the fiber comprises a high molecular weight polyethylene consisting essentially of a repeating unit of ethylene; it has an intrinsic viscosity number of 5 or larger and an average strength of 22 cN/-dtex or higher; and the number of frictions until the fiber is broken in an abrasion test according to method B for measuring abrasion resistance in the Testing Methods for Spun Yarn (JIS L 1095) is 100,000 or larger.

The present invention still further relates to chopped fibers, ropes, nets, ballistic materials or items, protective gloves, fiber reinforced concrete products, helmets, and other products obtained from the above high strength polyethylene fibers.

DETAILED DESCRIPTION OF THE INVENTION

Figure 1:
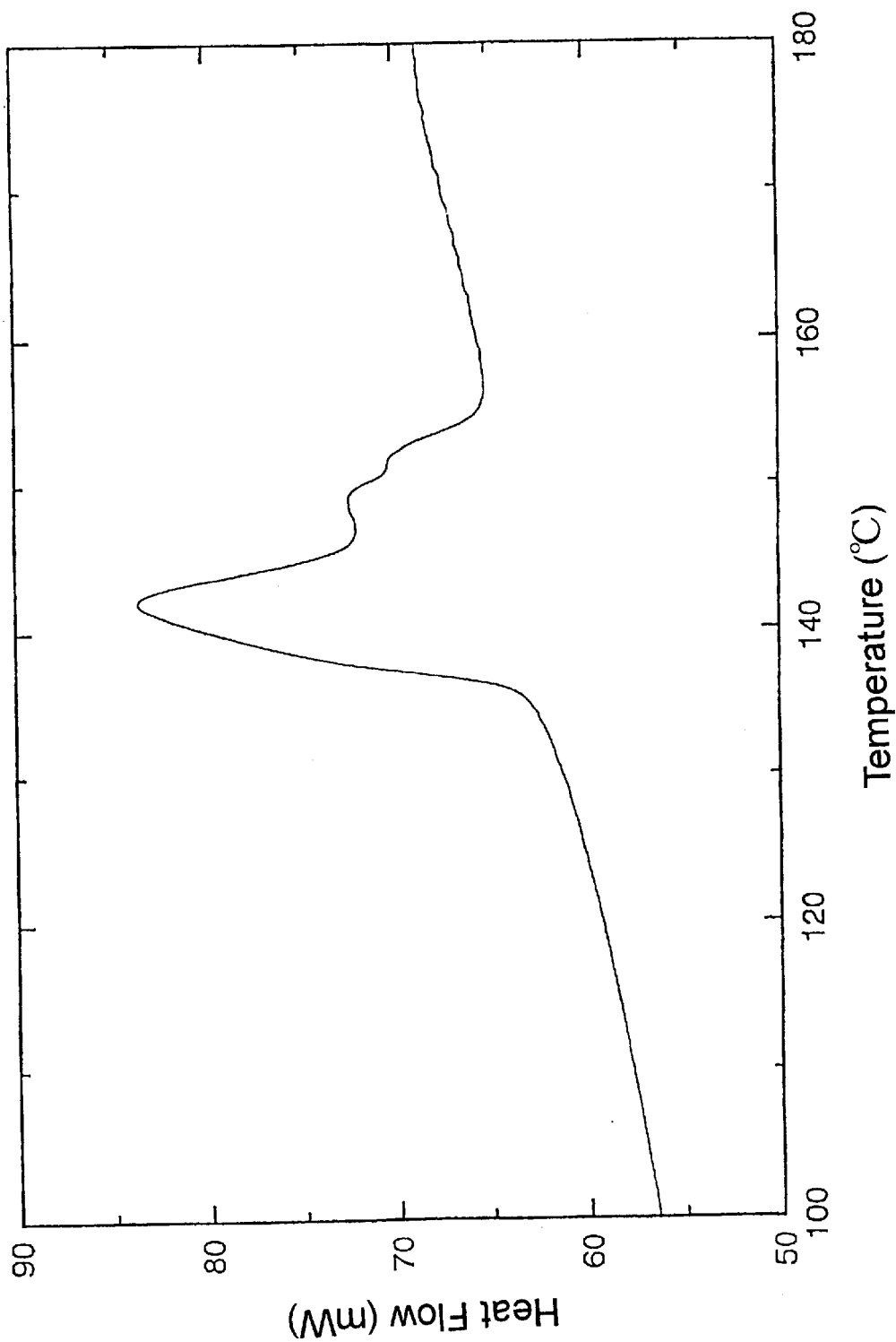
FIG. 1 shows a temperature-increasing DSC curve obtained by differential scanning calorimetry (DSC) of the high strength polyethylene fiber of Example 1.

The high strength polyethylene fibers of the present invention are composed of a high molecular weight polyethylene consisting essentially of a repeating unit of ethylene. As used herein, the expression "high molecular weight polyethylene consisting essentially of a repeating unit of ethylene" refers to a polyethylene, which may be regarded essentially as an ethylene homopolymer containing a repeating unit of ethylene at a ratio of 99.5 mol % or higher, preferably 99.8 mol % or higher, and which has an intrinsic viscosity number of 5 or larger, preferably 8 or larger, and more preferably 10 or larger. For the purpose of increasing the rate of polymerization, or the purpose of improving the creep and other characteristics of finally obtained fibers, the introduction of branches into the polyethylene by the addition of copolymerizable monomers such as α-olefins in very small amounts is recommended; however, higher amounts of copolymerizable monomers are not preferred for improving the durability of fibers because it is, for example, presumed that copolymerization with α-olefins prevents mutual sliding between the molecular chains in the crystals, which makes it impossible to achieve the relaxation of stress for continuously repeated deformation. If the base polymer has an intrinsic viscosity number of smaller than 5, it is difficult to exhibit the mechanical characteristics of fibers, particularly tensile strength. On the other hand, there is no upper limit to the intrinsic viscosity number; however, taking into consideration the stability and productivity in the yarn making process, the durability of fibers, and other factors, it is preferred that the intrinsic viscosity number is 30 or smaller. Intrinsic viscosity numbers larger than 30 may cause, for example, the lowering of durability in some cases depending upon drawing conditions for spun yarns.

Thus the high strength polyethylene fibers of the present invention composed of a high molecular weight polyethylene consisting essentially of a repeating unit of ethylene come to have an intrinsic viscosity number of 5 or larger. As used herein, the intrinsic viscosity number of fibers refers to a corresponding value obtained by viscosity measurement in decalin at 135° C. and extrapolation of $\eta_{sp}/c$ (where $\eta_{sp}$ is specific viscosity and c is concentration) toward zero concentration. In actual cases, viscosity measurement is carried out for some concentrations, and a straight line is drawn on the plot of specific viscosity $\eta_{sp}$ against concentration c by the method of least squares and extrapolated toward zero concentration to determine an intrinsic viscosity number.

Further, the high molecular weight polyethylene as the base polymer is not particularly limited, so long as finally obtained fibers meet the above intrinsic viscosity number. For improving the durability of fibers to its limit, the use of a base polymer having more narrow molecular weight distribution is preferred. The use of a base polymer having a molecular weight distribution index (Mw/Mn) of 5 or lower, which polymer is obtained using polymerization catalysts such as metallocene catalysts, is more preferred.

The high strength polyethylene fibers of the present invention have an average strength of 22 cN/dtex or higher. As used herein, the average strength refers to an average value of strength (cN/dtex) obtained by drawing of a strain-stress curve using a tensile tester under the conditions: length of specimen, 200 mm (gap distance between chucks); elongation rate, 100%/-min.; atmospheric temperature, 20° C.; and relative humidity, 65%; and calculation from the stress at the breaking point on the curve obtained (number of measurements, 10).

For the high strength polyethylene fibers of the present invention, their measurement by differential scanning calorimetry (DSC) exhibits a temperature-increasing DCS curve having at least one endothermic peak over a temperature region of 140° C. to 148° C. (on the low temperature side) and at least one endothermic peak over a temperature region of 148° C. or higher (on the high temperature side). The temperature-increasing DSC curve is obtained by using a specimen of fibers, which have been cut in 5 mm or shorter length, keeping the specimen in a completely free state under an atmosphere of an inert gas, and heating the specimen from room temperature up to 200° C. at a heating rate of 10° C./min. For the endothermic peaks, only employed are peaks, of which peak temperatures can be read, and the increased DSC curve obtained is corrected for the base line, followed by reading of peak temperatures and peak heights. As used herein, the base line refers to the part of a DSC curve in the temperature region where no transition nor reaction occurs in the test specimen as defined in the Testing Methods for Transition Temperatures of Plastics (JIS K 7121). The peak height refers to the distance measured vertically to the axis of abscissa between an interposed base line and the peak crest. In the Testing Methods for Transition Temperatures of Plastics (JIS K 7121), the peak is defined as the part of a DSC curve where the curve leaves the base line and then returns to the same base line. In the present invention, when the temperature-increasing DSC curve obtained is differentiated (i e., the first derivative curve is drawn) and the value of derivative (i.e., the distance measured vertically to the axis of abscissa between the first derivative curve and the axis of abscissa; the value of derivative has a plus or minus sign, if the curve is above or below the axis of abscissa, respectively) changes its sign from plus to minus, such part of the curve is defined as a peak, and the part of the curve where the value of derivative changes from the monotonous increase to the monotonous decrease while keeping its plus or minus sign is defined as a shoulder. From this definition, for example, it follows that the DSC curve shown in FIG. 2 has two peaks and the DSC curve shown in FIG. 4 has one peak and one shoulder.

By the way, JP-A 63-275708 discloses high strength polyethylene fibers obtained by a special technique using copolymerization with α-olefins, and describes that when these fibers are wound around an aluminum pan to stand in a constrained condition under tension and then subjected to measurement by differential scanning calorimetry (DSC), two or more peaks arising from copolymerization, in addition to the main peak, are observed on the high temperature side. It is, however, well known that when high strength polyethylene fibers in such a constrained condition under tension are subjected to DSC measurement, it usually causes an increase of the melting point, or in some case, the occurrence of two or more peaks arising from crystal transition or other factors.

In contrast, the high strength polyethylene fibers of the present invention are composed of a polyethylene which can be regarded essentially as an ethylene homopolymer, and the measurement by differential scanning calorimetry (DSC) in the present invention is carried out by using a specimen of fibers, which have been cut in 5 mm or shorter length, and keeping the specimen in a completely free state. To the inventors' knowledge, no report has been made in the past about high strength polyethylene fibers exhibiting, even in such case, two or more endothermic peaks on the high temperature side. The reason for the occurrence of two or more endothermic peaks on the high temperature side even in such completely free state seems to be the presence of a high-temperature melting-type crystal structure (hereinafter referred to as "HMC") different from the ordinary polyethylene crystal (hereinafter referred to as "EC"). As shown in Examples, favorable results are obtained when structure formation is achieved by more positive removal of solvents contained in the fiber surface. It can therefore be presumed that HMC is preferably formed on the surface layer of fibers, which HMC layer has a function to keep the strength of fibers and is a factor in the expression of extremely excellent flexural fatigue resistance and extremely excellent abrasion resistance. It is also presumed that excellent abrasion resistance prevents fibrillation and forms the fiber surface with high hardness.

JP-A 61-289111 discloses semi-stretched yarns obtained by the spinning method using two kinds of special solvents and describes that their DSC curves drawn by measurement in a "free state" has two or more endothermic peaks. Although there is no other way but to guess what is this "free state", it is well known that two or more endothermic peaks may often be observed even when fibers, which have not been cut short, are inserted in an aluminum pan for measurement because although it can be said that these fibers are in a freer state than that in the ordinary measurement with fibers wound around a small piece of aluminum, the fibers in the pan are, in fact, partly fixed between the bottom and the cover of the pan or there occurs uneven distribution of stress over the specimen. To avoid such influence in the measurement, a specimen should carefully be cut in very short length as done by the present inventors. Even if the measurement disclosed in the above publication is the same as that of the present invention, the temperature region of endothermic peaks disclosed in the above publication is different from that of the present invention, it is presumed from the following reason that the stretched yarns disclosed therein have poor flexural fatigue resistance and poor abrasion resistance. In the meantime, with the producing method disclosed in the above publication, i.e., slow technique in which the first and the second solvents are substantially removed just after spinning, it is quite difficult to provide the fiber surface with a close structure.

As described above, for the high strength polyethylene fibers of the present invention, the temperature-increasing DSC curve thereof has at least one endothermic peak over a temperature region of 140° C. to 148° C. In particular, such peak is preferably the main peak corresponding to the largest value of heat flow among two or more endothermic peaks found in the temperature-increasing DSC curve. It is presumed that the main peak reflects the ordinary structure (EC) occupying the major part of fibers, and if the peak temperature thereof is lower than 140° C., the fibers have insufficient heat resistance. In contrast, if the peak temperature thereof is higher than 148° C., the ordinary fiber structure becomes highly restricted, for example, an aggregate of completely-extended chains, lowering the durability of fibers. The present inventors have been found that the durability of fibers, particularly flexural fatigue resistance in this case, becomes optimum when the main peak appears over a temperature region of 140° C. to 148° C.

For the high strength polyethylene fibers of the present invention, the temperature-increasing DSC curve thereof further has at least one endothermic peak over a temperature region of 148° C. or higher (on the high temperature side). It is presumed that this endothermic peak on the high temperature side corresponds to the HMC structure having great influence on durability, particularly abrasion resistance, of which formation mechanism will be described below; and fibers exhibiting no endothermic peak on the high temperature side have extremely deteriorated abrasion resistance.

As described above, it is presumed that the maximum endothermic peak on the high temperature side among two or more endothermic peaks found in the temperature-increasing DSC curves of the high strength polyethylene fibers of the present invention is derived from the HMC structure. Adjusting the height of this maximum endothermic peak on the high temperature side makes it possible to obtain high strength polyethylene fibers having optimum durability.

In general, the fatigue of molecular-oriented fibers, of which typical examples are high strength polyethylene fibers, from flexure or abrasion is mainly caused by the fibrillation of the fibers from the surface layer. It is presumed that the high strength polyethylene fibers of the present invention have the surface layer of HMC with more entangled molecular chains, which results in a structure hardly causing fibrillation; therefore, the closer surface structure renders the fibers excellent flexural fatigue resistance and abrasion resistance, preventing the fibers from getting stuck together by pressure when they are cut.

It is, however, important that the high strength polyethylene fibers of the present invention should have a particular ratio of HMC occupying the whole crystal structure. As described above, it is presumed that the maximum endothermic peak on the high temperature side is derived from the fusion of EC and the maximum endothermic peak on the low temperature side is derived from the fusion of HMC. The height ratio of these maximum endothermic peaks over the respective temperature regions is usually in the range of 1.4:1.0 to 3.0:1.0, preferably 1.5:1.0 to 2.9:1.0, and more preferably 1.6:1.0 to 2.8:1.0. If the ratio is lower than 1.4:1.0, i.e., if the maximum endothermic peak on the high temperature side is relatively higher, this means that the ratio of HMC forming the surface layer of fibers is higher, which lowers the durability of fibers. This is probably because an excessive increase in the surface hardness promotes deterioration such as buckling fatigue. In contrast, if the ratio is higher than 3.0:1.0, i.e., if the maximum endothermic peak on the high temperature side is relatively lower, the ratio of HMC is lower, which makes no trouble for strength or Young's modulus but also makes no improvement in durability, so that fibers cannot be prevented from getting stuck together by pressure when they are cut, making is impossible to obtain chopped fibers having good dispersibility.

Further, the surface HMC structure according to the present invention is very effective for the improvement of impact resistance. To obtain high impact resistance, fibers are required to have high strength and high degree of elongation in the deformation at high strain rate, what is called, toughness. The surface HMC structure according to the present invention has a function to improve both of these characteristics. From the viewpoint of viscoelastic properties, polymer materials may be considered a combination of elastic components and viscous components as explained by, what is called, the Takayanagi model. In case of deformation at high strain rate, viscosity characteristics have a great contribution, and the surface HMC structure according to the present invention exhibits response on high strain deformation in the viscosity characteristics, making it possible to improve impact resistance. Therefore, the high strength polyethylene fibers of the present invention having such improved impact resistance are suitable for ballistic materials or items, or as the reinforcing fibers of helmets.

Thus the high strength polyethylene fibers of the present invention have remarkably improved durability, particularly abrasion resistance, as compared with the conventional high strength polyethylene fibers. More specifically, the number of frictions until the fiber is broken in an abrasion test according to method B for measuring abrasion resistance in the Testing Methods for Spun Yarn (JIS L 1095) is 100,000 or larger.

The high strength polyethylene fibers of the present invention should be produced with deliberation by a novel method of production, for example, the method described below, which is recommended, but it is, of course, not limited thereto.

First of all, a high molecular weight polyethylene as described above is uniformly dissolved in a solvent to give a spinning solution. The spinning solution has a concentration of usually 50% or lower, preferably 30% or lower. The solvent may include volatile solvents such as decalin or tetralin and non-volatile solvents such as paraffin oil or paraffin wax. The use of volatile solvents is preferred. This is because for solvents which are in solid state or nonvolatile at ordinary temperature, the rate of solvent extraction from filaments is slow and it is, therefore, difficult to achieve sufficient formation of HMC, whereas volatile solvents in the fiber surface are positively evaporated in the spinning to give a higher concentration in the fiber surface, making it possible to form a specific crystal structure (HMC) in which molecular chains are more highly oriented and connected with each other. In case of conventional spinning techniques, a structural difference between the fiber surface and the inside is responsible for a decrease in the strength of fibers; the selection of spinning conditions to make the sectional structure of fibers as uniform as possible is, therefore, common knowledge for persons of ordinary skill in the art of not only gel spinning but also dry spinning, wet spinning, and melt spinning of polyvinyl alcohol and polyacrylonitrile, for example, i.e., in the art of spinning in general.

On the contrary, the present inventors have found that the formation of a structural difference between the fiber surface and the inside at the step of spinning, more specifically the formation of HMC by instant and positive removal of solvents in the fiber surface to thereby concentrate the tension of spinning on the surface layer, makes it possible to obtain fibers keeping high strength and high Young's modulus and further having excellent flexural fatigue resistance and excellent abrasion resistance.

In the production of the high strength polyethylene fibers of the present invention, there is recommended a technique of blowing a high-temperature inert gas onto the discharged filaments just below the spinneret for the positive removal of solvents on the surface of the filaments. This results in the formation of a very thin HMC layer on the surface to thereby concentrate the tension of spinning, making it possible to form a specific structure in which molecular chains are connected with each other as described above. The temperature of the inert gas is usually 60° C. or higher, preferably 80° C. or higher, and more preferably 100° C. or higher but below 150° C. For the inert gas, the use of a nitrogen gas is preferred from an economical point of view, but it is not limited thereto.

The unstretched filaments thus obtained are heated again to remove the remaining solvents, during which they are drawn at a ratio of several times. Depending on the situation, multi-step drawing may be employed. The HMC structure of the surface layer formed in the spinning can never be eliminated in the later drawing steps, making it possible to obtain high strength polyethylene fibers having extremely excellent characteristics as described above. The high strength polyethylene fibers obtained, even if cut, hardly get stuck together by pressure when they are cut because of their having a close structure in the surface, although such sticking phenomenon is observed in the conventional fibers; therefore, chopped fibers or staples having good dispersibility can be obtained.

The high strength polyethylene fibers of the present invention have excellent flexural fatigue resistance and excellent abrasion resistance, while having about the same or higher strength and Young's modulus than those of the conventional high strength polyethylene fibers; therefore, the high strength polyethylene fibers of the present invention are suitable for various ropes or cables for industrial or private use, particularly running cables used for a long period, such as mooring ropes and hawsers; blind cables; printer cables; and they are also useful as the materials for various sports gears and sportswears, such as fishing lines, tents, sports socks and uniforms, and various garments. The high strength polyethylene fibers of the present invention are also extremely useful for high performance textiles such as ballistic materials or items, or protective gloves because of their excellent cut resistance and excellent blade resistance arising from the above excellent characteristics. The high strength polyethylene fibers of the present invention are further useful in the chemical processes because of their having close surface and therefore having remarkably improved resistance to chemicals, light and weather, as compared with the conventional ultrahigh molecular weight polyethylene fibers, for example, as the chopped fibers to produce non-woven fabrics such as chemical filters or battery cell separators, which are required to have chemical resistance. The high strength polyethylene fibers of the present invention are still further useful as the reinforcing fibers in the composite materials for sports gears such as helmets and skis and for speaker cones, as the reinforcing materials for concrete or mortar, particularly spray-coated concrete or normal plane concrete in tunnels, or as the fibers for reinforcing sheets and strands to provide earthquake resistance.

Now, among the applications of the high strength polyethylene fibers of the present invention, the following will describe chopped fibers, ropes, nets, ballistic materials or items, protective gloves, and fiber reinforcing concrete products, in particular.

The high strength polyethylene chopped fibers of the present invention can be obtained from the above novel high strength polyethylene fibers, and the amount of poorly dispersed fibers (fiber bundles of 40 $\mu$m or larger in maximum diameter formed by getting stuck together by pressure or fusion) found in case of paper making is preferably 5% by weight or smaller. If the amount of fiber bundles of 40 $\mu$m or larger in maximum diameter is greater than 5% by weight, uneven suction may occur to form spots when water is sucked under reduced pressure in the wet process of producing non-woven fabrics. The formation of spots is responsible for the deterioration of strength, stab resistance, and other characteristics of non-woven fabrics. The monofilament linear density of chopped fibers is not particularly limited, but usually in the range of 0.1 to 20 dpf. It may be changed according to the applications, for example, those of large linear density are used as the reinforcing fibers for concrete or cement, and for ordinary non-woven fabrics; and those of small linear density are used for high-density non-woven fabrics such as chemical filters or battery cell separators. The length of chopped fibers, i.e., the cut length of fibers, is preferably 70 mm or shorter, more preferably 50 mm or shorter. This is because if the cut length is too long, fibers easily cause entanglement to make their uniform dispersion difficult. Further, the method of cutting fibers may include, but is not particularly limited to, those of the guillotine type or the rotary cut type.

The high strength polyethylene chopped fibers of the present invention are useful as the chopped fibers to produce non-woven fabrics such as chemical filters, battery cell separators, and water-shield sheets for chemicals; as the reinforcing fibers for concrete or cement; and as the staples to produce feather blankets or spun yarns, because of their excellent resistance to chemicals, light and weather.

The ropes of the present invention can be produced using the above novel high strength polyethylene fibers as the base yarns, which fibers may be mixed with other fibers known in the art. Depending upon the design or function, for example, the ropes of the present invention may be covered on their surface with different materials such as low molecular weight polyolefins or urethane resins. The ropes of the present invention may be in any form, including twist structures, such as three-ply ropes and six-ply ropes; braid structures, such as eight-ply ropes, twelve-ply ropes, and double-braided ropes; and double-braid structures in which the core part of the ropes is helically covered on their periphery with yarns or strands; in any way, they may be designed for ropes of the ideal type adapted to their applications and performance.

The ropes of the present invention exhibit less deterioration in their performance by moisture absorption, water absorption, or other factors, and even if they are of small diameters, they have high strength, causes no kink and further have good storage characteristics. For this reason, the ropes of the present invention are the most suitable as various ropes for industrial or private use, such as fishery ropes, tag ropes, mooring ropes, hawsers, yacht ropes, climbing ropes, farming ropes, various kinds of ropes for civil engineering, architecture, wiring, and construction works, particularly for waterside applications related to shipping and fishery.

The nets of the present invention can be produced using the above novel high strength polyethylene fibers as the base yarns, which fibers may be mixed with other fibers known in the art. Depending upon the design or function, for example, the nets of the present invention may be covered on their periphery with different materials such as low molecular weight polyolefins or urethane resins. The nets of the present invention may be in any form, including knotted, knotless, Russell, and other structures; in any way, they may be designed for nets of the ideal type adapted to their applications and performance.

The nets of the present invention have strong mesh, excellent flexural fatigue resistance, and excellent abrasion resistance. For this reason, the nets of the present invention are useful as various nets for industrial or private use, such as various fishery nets including trawl nets, stationary nets, round haul nets, gauze nets, and gill nets; various farming nets for protection against beasts and birds; various sports nets including golf nets and protection nets against balls; safety nets; and various nets for civil engineering, wiring, and construction works.

The ballistic materials or items of the present invention can be produced using the above novel high strength polyethylene fibers as the base yarns, which fibers may be mixed with other fibers known in the art. The ballistic materials or items of the present invention may be produced by, for example, weaving the base yarns into cloths, or paralleling the base yarns along one direction and then impregnating the paralleled yarns with resins, followed by layering to form sheets so that the paralleling direction for one sheet is perpendicular to that for the next sheet; and laminating such two or more cloths or sheets.

The protective gloves of the present invention can be produced using the above novel high strength polyethylene fibers as the base yarns, which fibers may be mixed with the other fibers known in the art. The protective gloves of the present invention may be provided with functionality, including sweat absorption by mixing the base fibers with moisture-absorptive fibers such as cotton fibers, or improvement in the feeling of a fit when wore by mixing the base fibers with urethane-type stretch fibers. For design, the gloves of the present invention may be colored by mixing the base yarns with colored yarns, making it difficult to attract attention to their dirty parts or making it possible to improve their fashionability. The method of mixing the high strength polyethylene fiber filaments with other fibers may include interlacing treatment using air entanglement, or Taslan treatment, and may further include mixing with other fibers after opening the filaments by the application of voltage, or simple twisting, braiding or covering with the other fibers. When they are used as staples, the filaments are mixed with other fibers during the production of spun yarns, or after the production using the above method of mixing.

The protective gloves of the present invention have excellent cut resistance against sharp objects such as blades, as compared with protective gloves made of the conventional high strength polyethylene fibers. This is probably because the high strength polyethylene fibers of the present invention used have high surface hardness because of their HMC structure on the fiber surface. Therefore, the protective gloves of the present invention are useful as the gloves for working scenes requiring high cut resistance.

The fiber reinforced concrete products of the present invention can be produced using the above novel high strength polyethylene fibers as the reinforcing fibers. The reinforcing fibers have excellent cut resistance, probably because of their close surface, and when dispersed in a cement matrix, they hardly cause the flexure of fibers and exhibit good dispersion properties in the cement matrix. The reinforcing fibers have further improved resistance to chemicals, light and weather, because of their close surface, as compared with the conventional high strength polyethylene fibers, and they are the most suitable as the reinforcing fibers, particularly for concrete or cement, which is required to have chemical resistance against the alkaline properties of cement. Therefore, the fiber reinforced concrete products of the present invention exhibit good workability in their production, and have improved performance such as compressive strength, flexural strength and toughness, and further have excellent impact resistance and excellent durability.

EXAMPLES

The present invention will be further illustrated by some examples; however, the present invention is not limited to these examples.

First, the high strength polyethylene fibers of the present invention are exemplified by Examples 1 to 3 and Comparative Example 1 to 2. The polyethylene fibers prepared by these Examples and Comparative Examples were measured for their physical properties by the following measuring and testing methods, and evaluated for their performance.

Intrinsic Viscosity Number of Fibers

Using a capillary viscosity tube of the Ubbeloahde type, dilute solutions of different concentrations were measured for viscosity in decalin at 135° C., and intrinsic viscosity number was determined by drawing a straight line on the plot of their specific viscosity against concentrations by the method of least squares and extrapolation of the straight line toward zero concentration. In the measurement of viscosity, a specimen was cut to about 5 mm in length, and an antioxidant (under the trade name "Yoshinox BHT" available from Yoshitomi Pharmaceutical Industries, Ltd.) was added in 1 wt % relative to the specimen, followed by stirring at 135° C. for 4 hours for dissolution to give a solution for measurement.

Strength and Younges Modulus of Fibers

Using "Tensilon" available from Orientech Corp., a strain-stress curve was drawn under the conditions: length of specimen, 200 mm (gap distance between chucks); elongation rate, 100%/min.; atmospheric temperature, 20° C.; and relative humidity, 65%; and strength (cN/dtex) was calculated from the stress at the breaking point on the curve obtained, and Young's modulus (cN/dtex) was calculated from the tangent line providing the maximum gradient on the curve in the vicinity of the origin. The number of measurements was set at 10, and the strength and Young's modulus were expressed by the respective averaged values.

Differential Scanning Calorimetry (DSC) of Fibers

Using "DSC7" available from Perkin-Elmer Corp. (the maximum sensitivity, 8 $\mu$W/cm), DSC was carried out as follows. A specimen was cut in 5 mm or shorter, and about 5 mg of the specimen was charged and sealed in an aluminum pan. The same, but vacant, aluminum pan was used as a reference. A temperature-increasing DSC curve was drawn by heating the specimen from room temperature up to 200° C. at a heating rate of 10° C./min., under an atmosphere of an inert gas. The temperature-increasing DSC curve obtained was corrected for the base line, followed by reading the number of peaks, peak temperatures, and peak heights over a temperature region of 140° C. to 148° C. (on the low temperature side) and over a temperature region of 148° C. or higher (on the high temperature side), and calculating the height ratio of the maximum endothermic peak on the low temperature side and the maximum endothermic peak on the high temperature side. If the endothermic peaks are difficult to read because of their shoulder-like shapes, the values of heat flow at 145.5° C. and at 150° C. were regarded as the endothermic peaks on the low temperature side and on the high temperature side, respectively, to calculate the ratio of peak heights.

Abrasion Test of Fibers

A specimen was prepared by multiplying or adjustment to have a linear density of about 1500 dtex and evaluated for abrasion resistance by an abrasion test according to method B for measuring abrasion resistance in the Testing Methods for Spun Yarns (JIS L 1095). Using a 0.9 mm$\phi$ tip of hard steel as a friction contact, each test was carried out under the conditions: load, 0.5 g/d; rate of friction, 115 times/min.; distance of reciprocating motion, 2.5 cm; and angle of friction, 110°. The abrasion resistance was determined as the number of frictions until a specimen was broken. The number of runs was set at 2, and the results were expressed by their average values. The values were rounded off to the third digit.

Example 1

A slurry mixture of 10 wt % ultrahigh molecular weight polyethylene having an intrinsic viscosity number of 21.0 and a molecular weight distribution index (Mw/Mn) of 3.7 and 90 wt % decalin was fed to a screw-type kneader at 230° C., and their dissolution was achieved to give a spinning solution, followed by spinning at a rate of discharge through each nozzle of 1.4 g/min. using a spinneret (the diameter of each nozzle, 0.7 mm; the number of nozzles, 400) at 170° C. The discharged filaments were blown with a nitrogen gas at 100° C. as uniformly as possible at an average flow rate of 1.2 m/sec. through a slit-shaped orifice for gas feed, which orifice was disposed just below the spinneret, so that the decalin in the fiber surface was positively evaporated. Immediately after that, the filaments were substantially cooled with an air flow at 30° C., and wound at a rate of 75 m/min. by Nelson-type rollers disposed downstream the spinneret. At that time, the solvent contained in the filaments had already reduced its weight by half from the original weight. Subsequently, the filaments obtained were drawn at a ratio of 4 in a heating oven at 100° C. and further drawn at a ratio of 4 in a heating oven at 149° C., thereby obtaining a polyethylene fiber. The physical properties and performance evaluation of the fiber are shown in Table 1. The temperature-increasing DSC curve before base line correction, which was obtained by differential scanning calorimetry (DSC), is shown in FIG. 1.

Example 2

Figure 2:
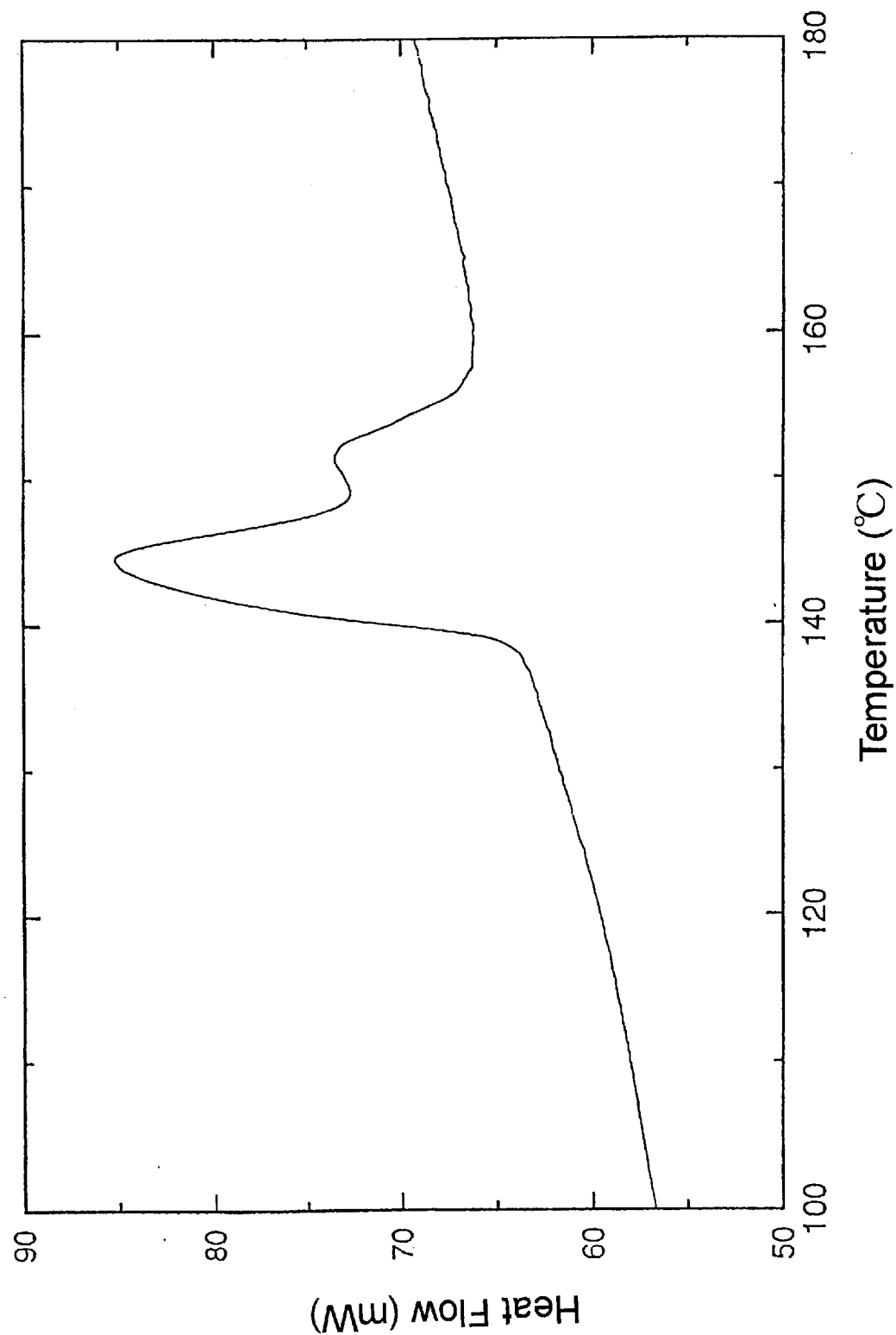
FIG. 2 shows a temperature-increasing DSC curve obtained by differential scanning calorimetry (DSC) of the high strength polyethylene fiber of Example 2.

A polyethylene fiber was prepared in the same manner as described in Example 1, except that the discharged filaments were blown with a nitrogen gas at 120° C. at an average flow rate of 1.4 m/sec. The physical properties and performance evaluation of the fiber are shown in Table 1. The temperature-increasing DSC curve before base line correction, which was obtained by differential scanning calorimetry (DSC), is shown in FIG. 2.

Example 3

Figure 3:
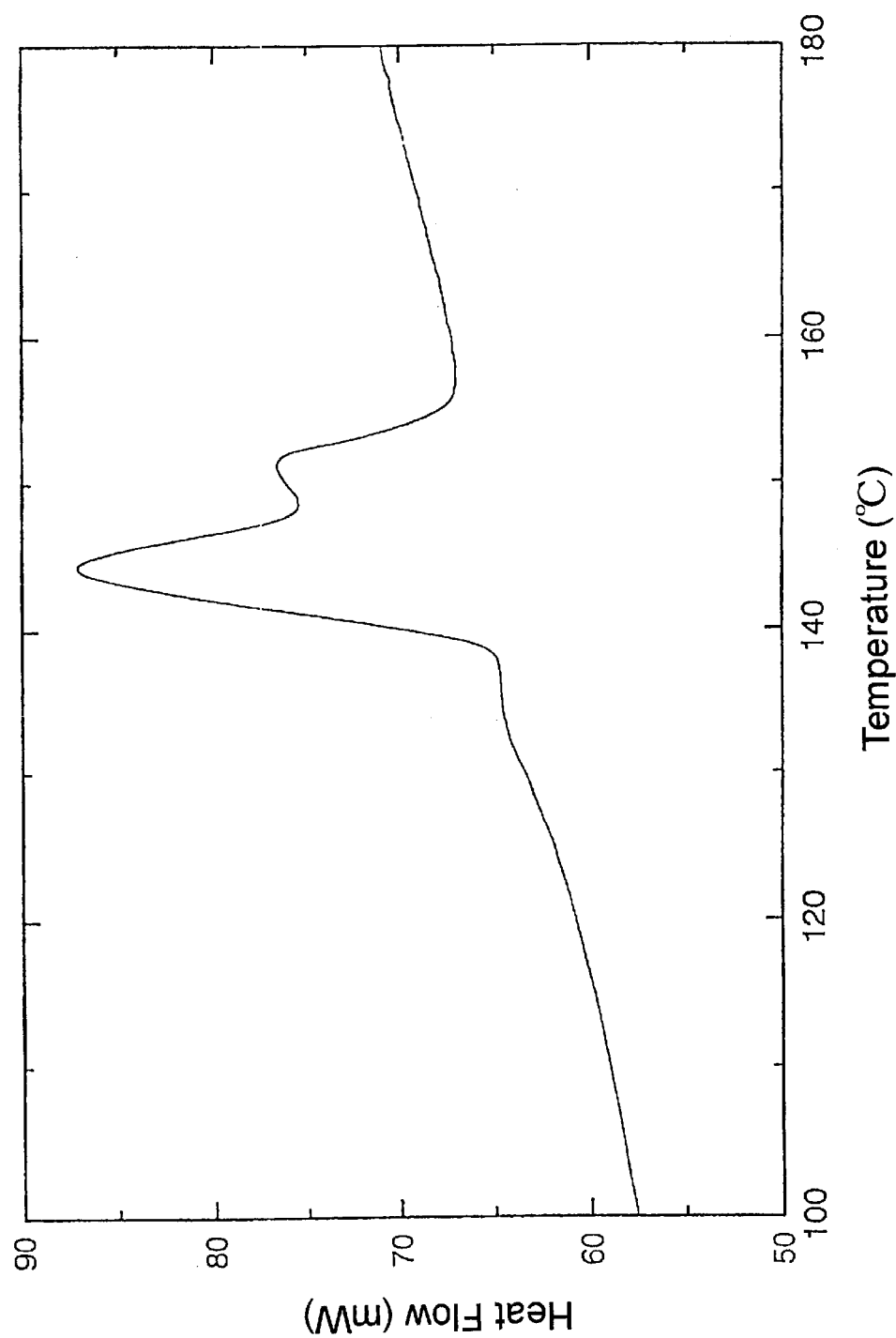
FIG. 3 shows a temperature-increasing DSC curve obtained by differential scanning calorimetry (DSC) of the high strength polyethylene fiber of Example 3.

A polyethylene fiber was prepared in the same manner as described in Example 1, except that a high molecular weight polyethylene having an intrinsic viscosity number of 12.1 and a molecular weight distribution index (Mw/Mn) of 5.4 was used; the concentration of a spinning solution was set at 30 wt %; and drawing was carried out at a ratio of 3 for the first stage and 2.2 for the second stage. The physical properties and performance evaluation of the fiber are shown in Table 1. The temperature-increasing DSC curve before base line correction, which was obtained by differential scanning calorimetry (DSC), is shown in FIG. 3.

Comparative Example 1

Figure 4:
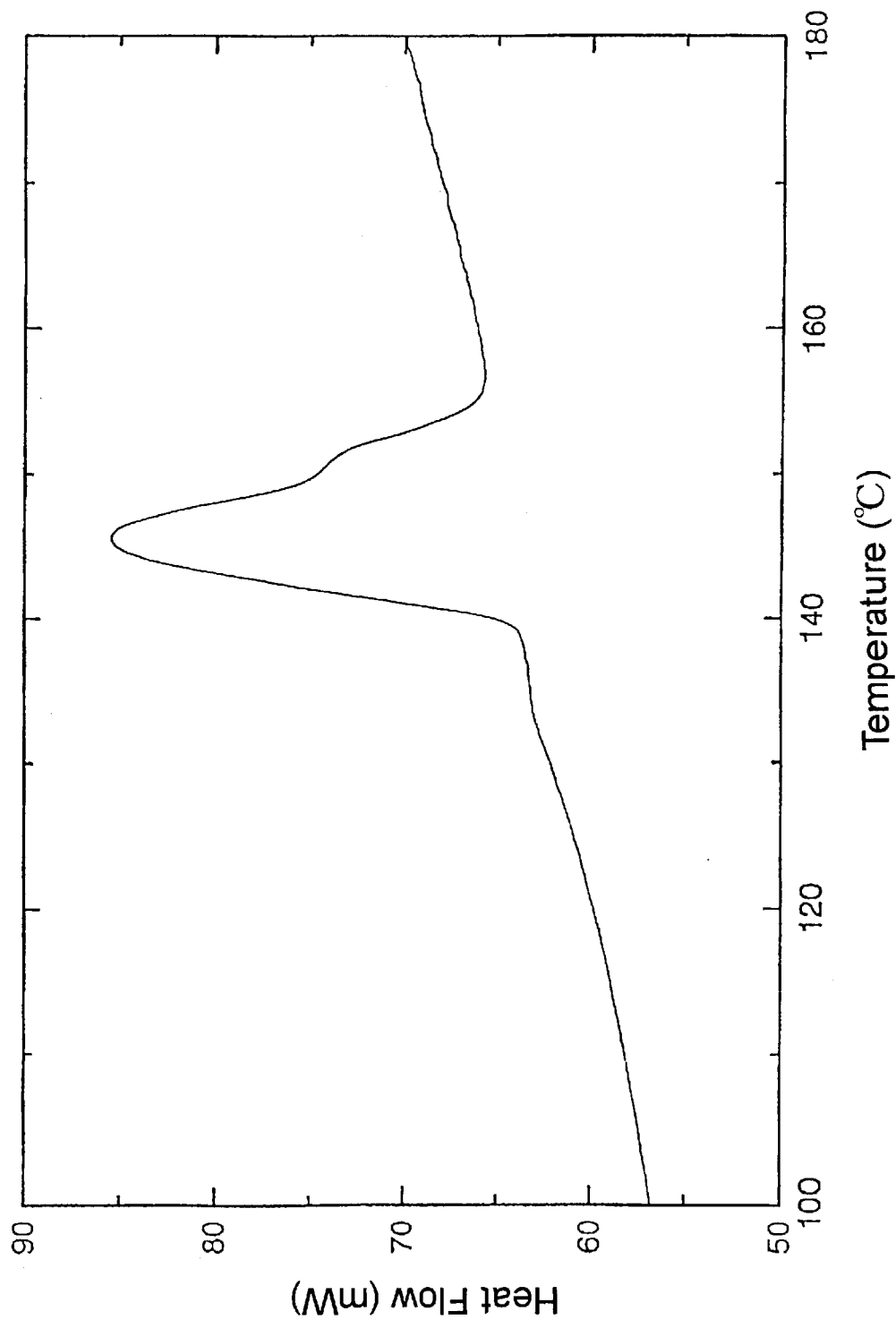
FIG. 4 shows a temperature-increasing DSC curve obtained by differential scanning calorimetry (DSC) of the high strength polyethylene fiber of Comparative Example 1.

A polyethylene fiber was prepared in the same manner as described in Example 1, except that the discharged filaments were not blown just below the spinneret with a high temperature nitrogen gas, but were immediately cooled with a nitrogen gas at 30° C.; and drawing was carried out at a ratio of 4.0 for the first stage and 3.5 for the second stage. The physical properties and performance evaluation of the fiber are shown in Table 1. The temperature-increasing DSC curve before base line correction, which was obtained by differential scanning calorimetry (DSC), is shown in FIG. 4.

Comparative Example 2

Figure 5:
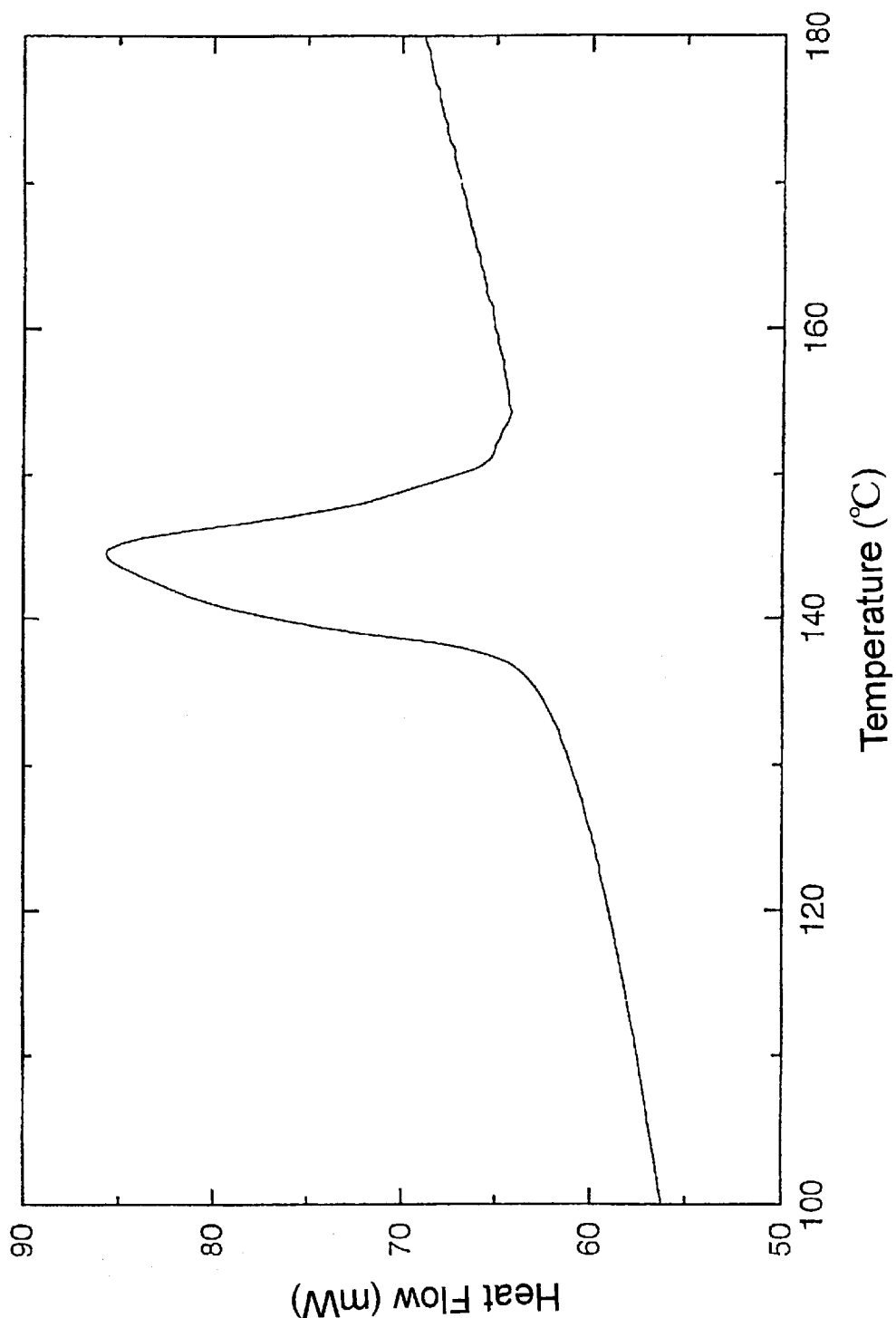
FIG. 5 shows a temperature-increasing DSC curve obtained by differential scanning calorimetry (DSC) of the high strength polyethylene fiber of Comparative Example 2.

Spinning was carried out in the same manner as described in Example 1, except that paraffin oil was used as a solvent; and drawing was carried out at a ratio of 4, while the solvent was substantially extracted in a cooling bath containing n-decane at about 80° C., which bath was disposed just below the spinneret. No positive cooling with an inert gas was carried out. The semi-stretched filaments obtained were further drawn at a ratio of 4 in an oven at 145° C. under an atmosphere of an inert gas, so that the n-decane contained was substantially evaporated, thereby obtaining a polyethylene fiber. The physical properties and performance evaluation of the fiber are shown in Table 1. The temperature-increasing DSC curve before base line correction, which was obtained by differential scanning calorimetry (DSC), is shown in FIG. 5.

formed by getting stuck together by pressure or fusion were taken out by observation with a loupe. The fiber bundles were measured for their diameter with a microscope, and the fiber bundles of 40 μm or larger in maximum diameter (poorly dispersed fibers) were measured for their total weight. Further, the weight including that of chopped fibers having good dispersibility was measured, and the content of poorly dispersed fibers (percent dispersion failure) was calculated. In this test, the results seems to vary widely; therefore, the number of runs was set at 10, and the results were expressed by their average values.

TABLE 1

|  | Intrinsic viscosity number | Linear density (dtex) | Mono-filament linear density (dtex) | Strength (cN/dtex) | Young's modulus (cN/dtex) | Number of frictions until fibers are broken (times) | Number of endothermic peaks Low temperature side | Number of endothermic peaks High temperature side | Temperature at maximum endothermic peak (° C.) Low temperature side | Temperature at maximum endothermic peak (° C.) High temperature side | Height ratio of maximum endothermic peaks |
|---|---|---|---|---|---|---|---|---|---|---|---|
| Example 1 | 18.5 | 455 | 1.2 | 38.1 | 1521 | 356,000 | 1 | 2 | 142.0 | 148.5 | 2.4:1 |
| Example 2 | 18.4 | 448 | 1.2 | 35.2 | 1612 | 421,000 | 1 | 1 | 144.7 | 151.3 | 2.4:1 |
| Example 3 | 9.4 | 1150 | 1.2 | 28.5 | 1055 | 381,000 | 1 | 1 | 144.3 | 151.7 | 2.0:1 |
| Comp. Ex. 1 | 18.4 | 541 | 1.2 | 34.2 | 1516 | 98,000 | 0 | 1 | 145.5 | — | (3.2:1)* |
| Comp. Ex. 2 | 18.3 | 471 | 1.2 | 35.7 | 1623 | 57,000 | 0 | 1 | 145.5 | — | — |

*: For reference, it shows a ratio calculated from the endothermic peak at 135° C. and the value of heat flow at 150° C.

As can be seen from Table 1, the polyethylene fibers of Examples 1 to 3 had extremely excellent abrasion resistance because of their 3.5 times larger numbers of frictions until the fibers were broken in the abrasion test, while exhibiting about the same or higher strength and Young's modulus, as compared with the polyethylene fibers of Comparative Examples 1 to 2. For the polyethylene fibers of Examples 1 to 3, the temperature-increasing DSC curves had one or two endothermic peaks on the high temperature side and one endothermic peak on the low temperature side. In contrast, for the polyethylene fiber of Comparative Example 1, the temperature-increasing DSC curve had no endothermic peak on the low temperature side, whereas no distinct peak but a shoulder was found as the endothermic peak on the high temperature side. For the polyethylene fiber of Comparative Example 2, the temperature-increasing DSC curve had one complete peak on the high temperature side, whereas no endothermic peak but a small shoulder around 133° C. was observed on the low temperature side. For the polyethylene fibers of Comparative Examples 1 and 2, it is presumed that their maximum endothermic peaks on the high temperature side come from EC and not from HMC, because of their extremely deteriorated abrasion resistance.

Now, the high strength polyethylene chopped fibers of the present invention are exemplified by Examples 4 to 8 and Comparative Examples 3 to 5. The chopped fibers prepared in these Examples and Comparative Examples were evaluated for their performance by the following testing method.

Dispersibility Test of Chopped Fibers

First, 0.02 g of chopped fibers was weighed, put into a beaker containing 300 ml of distilled water, stirred 50 times with a glass rod. The chopped fibers were then collected by filtering with a fine net such that they could not pass through, followed by air drying for 24 hours. Then, fiber bundles Example 4

The high strength polyethylene fibers prepared in Example 1 (intrinsic viscosity number, 18.5; linear density, 455 dtex; strength, 38.1 cN/-dtec; Young's modulus, 1521 cN/dtex) were cut in 10 mm by the guillotine method to give chopped fibers. Their performance evaluation is shown in Table 2.

Example 5

The high strength polyethylene fibers prepared in Example 2 (intrinsic viscosity number, 18.4; linear density, 448 dtex; strength, 35.2 cN/-dtec; Young's modulus, 1612 cN/dtex) were cut in 10 mm by the guillotine method to give chopped fibers. Their performance evaluation is shown in Table 2.

Example 6

The high strength polyethylene fibers prepared in Example 3 (intrinsic viscosity number, 9.4; linear density, 1150 dtex; strength, 28.5 cN/-dtec; Young's modulus, 1055 cN/dtex) were cut in 10 mm by the guillotine method to give chopped fibers. Their performance evaluation is shown in Table 2.

Example 7

A polyethylene fiber was prepared in the same manner as described in Example 1, except that a spinneret (the diameter of each nozzle, 0.2 mm; the number of nozzles, 200) was used and the rate of discharge through each nozzle was set at 0.08 g/min. For the fiber obtained, the intrinsic viscosity number was 18.5, the linear density was 240 dtex, the monofilament linear density was 0.12 dtex, the strength was 33.6 cN/dtex, the Young's modulus was 1342 cN/dtex, the number of frictions until the fiber was broken in the abrasion test was 103,000, and the temperature-increasing DSC curve obtained by differential scanning calorimetry (DSC) had one endothermic peak on the low temperature side and two endothermic peaks on the high temperature side, with the temperature of the maximum endothermic peak being 144.7° C. on the low temperature side and 159.2° C. on the high temperature side, and the height ratio of the maximum endothermic peaks being 2.4:1. This fiber was cut in 50 mm by the guillotine method to give chipped fibers. Their performance evaluation is shown in Table 2.

Example 8

A polyethylene fiber was prepared in the same manner as described in Example 1, except that a high molecular weight polyethylene having an intrinsic viscosity number of 10 and a molecular weight distribution index (w/Mn) of 5.4 was used; the concentration of a spinning solution was set at 30 wt %; a spinneret (the diameter of each nozzle, 0.2 mm; the number of nozzles, 200) was used; and the rate of discharge through each nozzle was set at 0.08 g/min. For the fiber obtained, the intrinsic viscosity number was 9.4, the linear density was 1265 dtex, the monofilament linear density was 0.63 dtex, the strength was 25.2 cN/dtex, the Young's modulus was 931 cN/dtex, the number of frictions until the fiber was broken in the abrasion test was 161,000, and the temperature-increasing DSC curve obtained by differential scanning calorimetry (DSC) had one endothermic peak on the low temperature side and two endothermic peaks on the high temperature side, with the temperature of the maximum endothermic peak being 143.9° C. on the low temperature side and 154.9° C. on the high temperature side, and the height ratio of the maximum endothermic peaks being 2.2:1. This fiber was cut in 10 mm by the guillotine method to give chopped fibers. Their performance evaluation is shown in Table 2.

Comparative Examples 3

The high strength polyethylene fibers prepared in Comparative Example 1 (intrinsic viscosity number, 18.4; linear density, 541 dtex; strength, 34.2 cN/dtec; Young's modulus, 1516 cN/dtex) were cut in 10 mm by the guillotine method to give chipped fibers. Their performance evaluation is shown in Table 2.

Comparative Examples 4

The high strength polyethylene fibers prepared in Comparative Example 2 (intrinsic viscosity number, 18.3; linear density, 471 dtex; strength, 35.7 cN/dtec; Young's modulus, 1623 cN/dtex) were cut in 10 mm by the guillotine method to give chopped fibers. Their performance evaluation is shown in Table 2.

Comparative Example 5

A polyethylene fiber was prepared in the same manner as described in Example 1, except that paraffin oil was used as a solvent; and the filament was drawn at a ratio of 4 in a heating oven at 100° C. and then at a ratio of 4 in a heating oven at 149° C. For the fiber obtained, the intrinsic viscosity number was 18.5, the linear density was 455 dtex, the monofilament linear density was 1.2 dtex, the strength was 38.1 cN/dtex, the Young's modulus was 1521 cN/dtex, the number of frictions until the fiber was broken in the abrasion test was 421,000, and the temperature-increasing DSC curve obtained by differential scanning calorimetry (DSC) had one endothermic peak on the low temperature side and two endothermic peaks on the high temperature side, with the temperature of the maximum endothermic peak being 144.3° C. on the low temperature side and 152.1° C. on the high temperature side, and the height ratio of the maximum endothermic peaks being 2.4:1. This fiber was cut in 80 mm by the guillotine method to give chopped fibers. Their performance evaluation is shown in Table 2.

TABLE 2

|  | Intrinsic viscosity number | Linear density (dtex) | Monofilament linear density (dtex) | Cut length (mm) | Dispersion failure (%) |
|---|---|---|---|---|---|
| Example 4 | 18.5 | 455 | 1.2 | 10 | 2.4 |
| Example 5 | 18.4 | 448 | 1.2 | 10 | 2.6 |
| Example 8 | 9.4 | 1150 | 1.2 | 10 | 1.8 |
| Example 7 | 18.5 | 240 | 0.12 | 50 | 3.9 |
| Example 8 | 9.4 | 1265 | 0.63 | 10 | 3.9 |
| Comp. Ex. 3 | 18.4 | 541 | 1.2 | 10 | 11.7 |
| Comp. Ex. 4 | 18.3 | 471 | 1.2 | 10 | 15.1 |
| Comp. Ex. 5 | 18.5 | 455 | 1.2 | 80 | 7.1 |

As can be seen from Table 2, the chopped fibers of Examples 4 to 8 exhibited low dispersion failure and therefore had excellent dispersibility, as compared with the chopped fibers of Comparative Examples 3 to 5.

Now, the ropes using the high strength polyethylene fibers of the present invention are exemplified by Examples 9 to 10 and Comparative Examples 6 to 7. The ropes prepared in these Examples and Comparative Examples were evaluated for their performance by the following methods.

Strength Measurement and Flexural Fatigue Test of Ropes

A rope was fixed on both ends with resin sockets ("Socket Strong" available from Sugita Industry, Co., Ltd.), and used as the test specimen. The rope was measured for strength at a draw speed of 20 cm/min. using "Servo Pulser™" available from Shimadzu Corporation. The rope was immersed in water at room temperature for 24 hours, and then immediately measured for strength by the same method, thereby determining the wet strength of the rope. Further, the flexural fatigue test was carried out by running the rope through a pulley of 250 mmφ and repeatedly flexing $5 \times 10^5$ times under a load corresponding to 20% of breaking strength. After the test, the rope was fixed again with resin sockets, and then measured for strength to calculate the residual strength (%).

Example 9

The high strength polyethylene fiber prepared in Example 1 (intrinsic viscosity number, 18.5; linear density, 455 dtex; strength, 38.1 cN/dtec; Young's modulus, 1521 cN/dtex) was multiplied for adjustment of linear density, followed by twisting at 100 times/m to give a base yarn. This base yarn was used to prepare a six-ply rope (with a wire rope structure) of about 10 mmφ in thickness. The performance evaluation is shown in Table 3.

Example 10

A rope was prepared in the same manner as described in Example 9, except that the high polyethylene fiber prepared in Example 2 (intrinsic viscosity number, 18.4; linear density, 448 dtex; strength, 35.2 cN/dtec; Young's modulus, 1612 cN/dtex) was used. The performance evaluation is shown in Table 3.

Comparative Example 6

A rope was prepared in the same manner as described in Example 10, except that a commercially available nylon fiber (linear density, 467 dtex; strength, 7.3 cN/dtec; Young's modulus, 44 cN/dtex) was used. The performance evaluation is shown in Table 3.

Comparative Example 7

A rope was prepared in the same manner as described in Example 10, except that a commercially available polyethylene terephthalate fiber (linear density, 444 dtex; strength, 7.4 cN/dtec; Young's modulus, 106 cN/dtex) was used. The performance evaluation is shown in Table 3.

TABLE 3

| | Rope diameter (mm) | Strength ($10^6$ g) | Wet strength ($10^6$ g) | Residual strength after $5 \times 10^5$ times repeated flexing (%) |
|---|---|---|---|---|
| Example 9 | 10 | 3.8 | 3.8 | 100 |
| Example 10 | 10 | 3.5 | 3.5 | 100 |
| Comp. Ex. 6 | 10 | 2.0 | 1.8 | 90 |
| Comp. Ex. 7 | 10 | 2.3 | 2.3 | 75 |

As can be seen from Table 3, the ropes of Examples 9 and 10 exhibited higher strength and higher wet strength, and there was observed no decrease in the strength after repeated flexing; therefore, they had excellent flexural fatigue resistance, as compared with the ropes of Comparative Examples 6 and 7.

Now, the nets using the high strength polyethylene fibers of the present invention are exemplified by Examples 11 to 12 and Comparative Examples 8 and 9. The nets prepared in these Examples and Comparative Examples were evaluated for their performance by the following testing methods.

Strength Measurement, Flexural Fatigue Test, and Abrasion Test of Nets

The measurement of strength was carried out in dry state using "Servo Pulser™" available from Shimadzu Corporation under the conditions: gap distance between chucks, 20 cm; and draw rate, 10 cm/min. according to the measuring method for strength in the Testing Methods for Synthetic Fiber Fishing Net Meshes (JIS L 1043). Further, the flexural fatigue test was carried out by fixing the net at both ends with resin sockets ("Socket Strong" available from Sugita Industry Co., Ltd.), running the net through a pulley of 250 mmφ, and repeatedly flexing $5 \times 10^5$ times under a load corresponding to 20% of breaking strength. After the test, the socket parts were removed from the net by cutting, and the net was measured for strength in the same manner as described above to calculate residual strength (%). The abrasion test was carried out by measuring the number of frictions until the twisted yarn was broken by friction in water against a Tungalloy™ edge as a friction contact at an angle of friction of 120° using a fishing net testing machine under the conditions: distance of frictional motion, 12 cm; rate of friction, 30 times/min.; and drawing load, 1 kg.

Example 11

The high strength polyethylene fiber prepared in Example 1 (intrinsic viscosity number, 18.5; linear density, 455 dtex; strength, 38.1 cN/dtec; Young's modulus, 1521 cN/dtex) was adjusted to 1200 d, followed by twisting at 180 times/m to give a base yarn. Four base yarns of this type were twisted at 120 times/m to give a net. The performance evaluation is shown in Table 4.

Example 12

A net was prepared in the same manner as described in Example 11, except that the high polyethylene fiber prepared in Example 2 (intrinsic viscosity number, 18.4; linear density, 448 dtex; strength, 35.2 cN/dtec; Young's modulus, 1612 cN/dtex) was used. The performance evaluation is shown in Table 4.

Comparative Example 8

A net was prepared in the same manner as described in Example 11, except that the high strength polyethylene fiber prepared in Comparative Example 1 (intrinsic viscosity number, 18.4; linear density, 541 dtex; strength, 34.2 cN/dtec; Young's modulus, 1516 cN/dtex) was used. The performance evaluation is shown in Table 4.

Comparative Example 9

A net was prepared in the same manner as described in Example 11, except that the high strength polyethylene fiber prepared in Comparative Example 2 (intrinsic viscosity number, 18.3; linear density, 471 dtex; strength, 35.7 cN/dtec; Young's modulus, 1623 cN/dtex) was used. The performance evaluation is shown in Table 4.

TABLE 4

| | Constitution | Strength (N) | Residual strength after $5 \times 10^5$ times repeated flexing | Number of frictions until breaking (times) |
|---|---|---|---|---|
| Example 11 | 1200 d × 4 | 1137 | 100 | 2260 |
| Example 12 | 1200 d × 4 | 1176 | 100 | 2340 |
| Comp. Ex. 8 | 1200 d × 4 | 1052 | 90 | 988 |
| Comp. Ex. 9 | 1200 d × 4 | 1025 | 87 | 875 |

As can be seen from Table 4, the nets of Examples 11 and 12 exhibited higher strength, no decrease was observed in the strength after repeated flexing, and the number of frictions until breaking was at least two times larger; therefore, they had excellent flexural fatigue resistance and excellent abrasion resistance, as compared with the nets of Comparative Examples 8 and 9.

Now, the fiber reinforced concrete products using the high strength polyethylene fibers of the present invention are exemplified by Examples 13 to 15 and Comparative Examples 10 to 12. The concrete test pieces prepared in these Examples and Comparative Examples were evaluated for their performance by the following test for strength.

Test for Strength of Concrete Test Pieces

In the compressive test, the maximum load was measured to determine the compressive strength. In the flexural test, the maximum load was measured to determine the flexural strength according to the method for measuring flexural strength in the Physical Testing Methods for Cement (JIS R 5201). For toughness, the relationship between the load and the cross-head displacement in the testing machine was recorded onto an X-Y recorder (available from Yokogawa Electric Corporation), and the area under the flexural stress-deflection curve until the displacement falling down to 50% of the value at the maximum load was determined, and the toughness was regarded as an area ratio with the area in case of no fiber incorporation being taken as 1.

Example 13

The high strength polyethylene fiber prepared in Example 1 (intrinsic viscosity number, 18.5; linear density, 455 dtex; strength, 38.1 cN/dtex; Young's modulus, 1521 cN/dtex) was cut in 30 mm length and used as the reinforcing fibers.

First, high-early-strength portland cement (specific gravity, 3.13), Toyoura-keisa-sand (old standard sand; specific gravity, 2.7) as fine aggregate, and silica fume (specific gravity, 2.2) as mineral admixture were placed in a 5 L volume omni-mixer and dry mixed for 15 seconds. The above reinforcing fibers were then put into the mixer, followed by dry mixing for another 30 seconds. Water and air entraining and high-range water reducing agent (without incorporation of auxiliary air entraining agents) were then put into the mixer, followed by mixing for 4 minutes to give fiber reinforced concrete. The water-to-binder ratio was set at 33%; the mixing ratio of silica fume relative to the weight of cement, 10%; the sand-to-binder ratio, 60%; the mixing ratio of air entraining and high-range water reducing agent relative to the weight of binder, 2.0%; and the mixing ratio of fiber by volume, 2.0%. The measured flow values are shown in Table 5.

Using the fiber reinforced concrete obtained, three cylindrical test pieces (50 mm$\phi$×100 mm) for compressive test and three prismatic test pieces (40×40×160 mm) for flexural test were prepared by hand-placing with a mallet and a trowel. The test pieces thus obtained were subject to the standard cure over 14 days before the test for strength. The results are shown in Table 5.

Example 14

A fiber reinforced concrete test piece was prepared in the same manner as described in Example 13, except that the high polyethylene fiber prepared in Example 2 (intrinsic viscosity number, 18.4; linear density, 448 dtex; strength, 35.2 cN/dtec; Young's modulus, 1612 cN/dtex) was used; and then subjected to the test for strength. The results are shown in Table 5.

Example 15

A fiber reinforced concrete test piece was prepared in the same manner as described in Example 13, except that the high polyethylene fiber prepared in Example 3 (intrinsic viscosity number, 9.4; linear density, 1150 dtex; strength, 28.5 cN/dtec; Young's modulus, 1055 cN/dtex) was used; and then subjected to the test for strength. The results are shown in Table 5.

Comparative Example 10

A fiber reinforced concrete test piece was prepared in the same manner as described in Example 13, except that the high polyethylene fiber prepared in Comparative Example 1 (intrinsic viscosity number, 18.4; linear density, 541 dtex; strength, 34.2 cN/dtec; Young's modulus, 1516 cN/dtex) was used; and then subjected to the test for strength. The results are shown in Table 5.

Comparative Example 11

A fiber reinforced concrete test piece was prepared in the same manner as described in Example 13, except that the high polyethylene fiber prepared in Comparative Example 2 (intrinsic viscosity number, 18.3; linear density, 471 dtex; strength, 35.7 cN/dtec; Young's modulus, 1623 cN/dtex) was used; and then subjected to the test for strength. The results are shown in Table 5.

Comparative Example 12

A fiber reinforced concrete test piece was prepared in the same manner as described in Example 13, except that no reinforcing fiber was used; and then subjected to the test for strength. The results are shown in Table 5.

TABLE 5

| | Mixing ratio of fiber by volume (%) | Flow value (mm) | Compressive strength (MPa) | Flexural strength (MPa) | | Toughness |
|---|---|---|---|---|---|---|
| | | | | Cracking | Max. | |
| Example 13 | 2 | 181 | 83.8 | 12.8 | 22.0 | 83.6 |
| Example 14 | 2 | 172 | 81.5 | 12.5 | 20.5 | 78.1 |
| Example 15 | 2 | 179 | 83.2 | 12.7 | 21.6 | 80.5 |
| Comp. Ex. 10 | 2 | 150 | 74.5 | 11.8 | 14.2 | 24.8 |
| Comp. Ex. 11 | 2 | 143 | 75.5 | 12.4 | 13.4 | 14.3 |
| Comp. Ex. 12 | 0 | 153 | 71.1 | 12.0 | 12.0 | 1.0 |

As can be seen from Table 5, the test pieces of Examples 13 to 15 exhibited higher compressive strength, higher flexural strength, and higher toughness; therefore, they had excellent impact resistance and excellent durability, as compared with the test pieces of Comparative Examples 10 to 12.

Now, the protective glove materials using the high strength polyethylene fibers of the present invention are exemplified by Examples 16 to 18 and Comparative Examples 13 to 14. The protective glove materials prepared in these Examples and Comparative Examples were evaluate for their performance by the following cutting test.

Cutting Test for Protective Glove Materials

The cutting test was carried out using a Coup testa™ (available from SODEMAT Corp.; France). This machine is fabricated such that a specimen is cut by allowing a round blade to move on the specimen, which round blade is rotated in the direction opposite to the direction of moving, and after the completion of cutting, aluminum foil laid under the specimen comes in contact with the round blade to turn on the electricity, thereby sensing the completion of the test. While the round blade is in operation, a counter provided in the machine shows a numerical value connected with the number of rotation of the round blade, and this numerical value is recorded.

In this test, a plain-woven cotton fabric of about 200 g/m$^2$ in weight was used as a blank. The cutting level of a specimen relative to this blank was regarded as the cut resistance, and the evaluation was carried out as follows. First, the test was started with the blank, and repeated alternately for the blank and the specimen. After the specimen was tested five times, the last run was carried out for the blank, and a series of runs was completed for one specimen. From the counts in the respective runs, the index values were calculated by the following equation, and the cut resistance was evaluated by their average value in the test repeated five times.

Index=(count of sample+A)/A

A=(count of cotton fabric before test of sample+count of cotton fabric after test of sample)/2

The round blade used in the test was a 45 mm$\phi$ new blade (material, SKS-7 tungsten steel; blade thickness, 0.3 mm)

for L-type rotary cutters available from OLFA Corp., and the load applied to a specimen in the test was set at 320 g.

Example 16

Using the high strength polyethylene fiber prepared in Example 1 (intrinsic viscosity number, 18.5; linear density, 455 dtex; strength, 38.1 cN/dtex; Young's modulus, 1521 cN/dtex), a plain knitted fabric was prepared with a circular knitting machine. The protective glove material obtained was tested on the back side with a Coup testa for the evaluation of cut resistance. The results are shown in Table 6.

Example 17

A plain knitted fabric was prepared in the same manner as described in Example 16, except that the high strength polyethylene fiber prepared in Example 2 (intrinsic viscosity number, 18.4; linear density, 448 dtex; strength, 35.2 cN/dtex; Young's modulus, 1612 cN/dtex) was used; and then subjected to the cutting test. The results are shown in Table 6.

Example 18

A plain knitted fabric was prepared in the same manner as described in Example 16, except that the high strength polyethylene fiber prepared in Example 3 (intrinsic viscosity number, 9.4; linear density, 1150 dtex; strength, 28.5 cN/dtex; Young's modulus, 1055 cN/dtex) was used; and then subjected to the cutting test. The results are shown in Table 6.

Comparative Example 13

A plain knitted fabric was prepared in the same manner as described in Example 16, except that the high strength polyethylene fiber prepared in Comparative Example 1 (intrinsic viscosity number, 18.4; linear density, 541 dtex; strength, 34.2 cN/dtex; Young's modulus, 1516 cN/dtex) was used; and then subjected to the cutting test. The results are shown in Table 6.

Comparative Example 14

A plain knitted fabric was prepared in the same manner as described in Example 16, except that the high strength polyethylene fiber prepared in Comparative Example 2 (intrinsic viscosity number, 18.3; linear density, 471 dtex; strength, 35.7 cN/dtex; Young's modulus, 1623 cN/dtex) was used; and then subjected to the cutting test. The results are shown in Table 6.

TABLE 6

| | Index values | | | | | |
|---|---|---|---|---|---|---|
| | 1st run | 2nd run | 3rd run | 4th run | 5th run | average |
| Example 16 | 6.01 | 6.33 | 7.26 | 7.27 | 6.59 | 6.69 |
| Example 17 | 5.88 | 7.20 | 6.93 | 6.32 | 6.80 | 6.63 |
| Example 18 | 7.98 | 7.12 | 8.12 | 7.54 | 8.66 | 7.88 |
| Comp. Ex. 13 | 4.67 | 4.67 | 4.40 | 5.00 | 6.67 | 5.08 |
| Comp. Ex. 14 | 5.45 | 4.39 | 4.82 | 5.11 | 5.75 | 5.10 |

As can be seen from Table 6, the protective glove materials of Examples 16 to 18 exhibited higher index values by 1.0 or more; therefore, they had excellent cut resistance, as compared with the protective glove materials of Comparative Examples 13 and 14.

Now, the ballistic materials or items using the high strength polyethylene fibers of the present invention are exemplified in Example 19 and Comparative Example 15. The ballistic materials prepared in these Examples and Comparative Example were evaluated for their performance by the following ballistic test.

Ballistic Test for Ballistic Materials

A specimen of materials was cut into squares each measuring 20 cm in one side, and these squares were layered to have a weight of about 1 kg/m² and then peripherally fastened with over-locks to give a specimen for ballistic test.

The ballistic test was carried out according to MIL-STD-662E. A 17-grain fragment simulating projectile as described in MIL-P-46593A was discharged at a speed of about 500 m/sec. from a barrel with a propellant to collide with the specimen. At that time, speeds $V_1$ and $V_2$ of the fragment simulating projectile before the collision with the specimen and after the penetration, respectively, were measured with a chronograph using a photoscreen. The impact resistance was evaluated by unit energy loss (SEA) calculated from the measured speeds $V_1$ and $V_2$ by the following equation.

$$SEA = 1/2 \times (V_1^2 - V_2^2) \times 0.0011 / \text{sample weight}$$

The number of runs was set at 3, and the value of SEA was expressed by their average value.

Example 19

The high strength polyethylene fiber obtained in Example 2 (intrinsic viscosity number, 18.4; linear density, 448 dtex; strength, 35.2 cN/dtex; Young's modulus, 1612 cN/dtex) was twisted to have a twist coefficient of 0.7, thereby obtaining a base yarn. A plain-woven fabric (weight, 180.6 g/m²) with the numbers of warp yarns and weft yarns being both 48 yarns/25 mm was prepared with this base yarn. The ballistic material obtained was subjected to the ballistic test. The results are shown in Table 7.

Comparative Example 15

A plain-woven fabric (weight, 188.1 g/m² was prepared in the same manner as described in Example 19, except that the high strength polyethylene fiber obtained in Comparative Example 2 (intrinsic viscosity number, 18.3; linear density, 471 dtex; strength, 35.7 cN/dtex; Young's modulus, 1623 cN/dtex) was used; and then subjected to the ballistic test. The results are shown in Table 7.

TABLE 7

| | Fabric weight (g/m²) | Number of layers (pieces) | Weight of specimen (g/m²) | SEA (J/(kg/m²)) |
|---|---|---|---|---|
| Example 19 | 180.6 | 6 | 1085 | 25.2 |
| Comp. Ex. 15 | 188.1 | 6 | 1130 | 23.9 |

As can be seen from Table 7, the ballistic material of Example 19 exhibited higher unit energy loss; thereby it had excellent impact resistance, as compared with the ballistic material of Comparative Example 15.

Industrial Applicability

According to the present invention, high strength polyethylene fibers can be obtained, which have about the same or higher strength and Young's modulus than those of the conventional high strength polyethylene fibers, and at the same time, have excellent durability, particularly flexural fatigue resistance and excellent abrasion resistance. Such high strength polyethylene fibers can be widely applied in various fields for industry, for example, as the chopped fibers or staples to produce non-woven fabrics or spun yarns; as various ropes or nets for industrial or private use; as the materials for high performance textiles such as ballistic materials or items and protective gloves; or as the reinforcing fibers for composite materials such as fiber reinforced concrete products and helmets.

What is claimed is:

1. A high strength polyethylene fiber characterized in that: the fiber comprises a high molecular weight polyethylene consisting essentially of a repeating unit of ethylene; it has an intrinsic viscosity number of 5 or larger and an average strength of 22 cN/dtex or higher; and the measurement of the fiber by differential scanning calorimetry (DSC) exhibits a temperature-increasing DCS curve having at least one endothermic peak over a temperature region of 140° C. to 148° C. (on the low temperature side) and at least one endothermic peak over a temperature region of 148° C. or higher (on the high temperature side).

2. The high strength polyethylene fiber according to claim 1, wherein the height ratio of the maximum endothermic peak on the low temperature side and the maximum endothermic peak on the high temperature side is 1.4:1.0 to 3.0:1.0.

3. The high strength polyethylene fiber according to claim 2, wherein the height ratio of the maximum endothermic peak on the low temperature side and the maximum endothermic peak on the high temperature side is 1.5:1.0 to 2.9:1.0.

4. A high strength polyethylene fiber characterized in that: the fiber comprises a high molecular weight polyethylene consisting essentially of a repeating unit of ethylene; it has an intrinsic viscosity number of 5 or larger and an average strength of 22 cN/dtex or higher; and the number of frictions until the fiber is broken in an abrasion test according to method B for measuring abrasion resistance in Testing Methods for Spun Yarn (JIS L 1095) is 100,000 or larger.

5. A high strength polyethylene chopped fiber obtained from the high strength polyethylene fiber according to claim 1 or 4.

6. The high strength polyethylene chopped fiber according to claim 5, wherein the amount of poorly dispersed fibers (fiber bundles of 40 μm or larger in maximum diameter formed by getting stuck together by pressure or fusion) found in case of paper making is 5% by weight or smaller.

7. The high strength polyethylene chopped fiber according to claim 5, wherein the fiber has a cut length of 70 mm or shorter.

8. A fiber reinforced concrete product comprising the high strength polyethylene fiber according to claim 1 or 4.

9. A helmet comprising the high strength polyethylene fiber according to claim 1 or 4.

* * * * *